June 9, 1959  D. L. CRONIN  2,890,404
GENERATOR CONTROL SYSTEM EMPLOYING SEMICONDUCTOR APPARATUS
Filed June 28, 1957
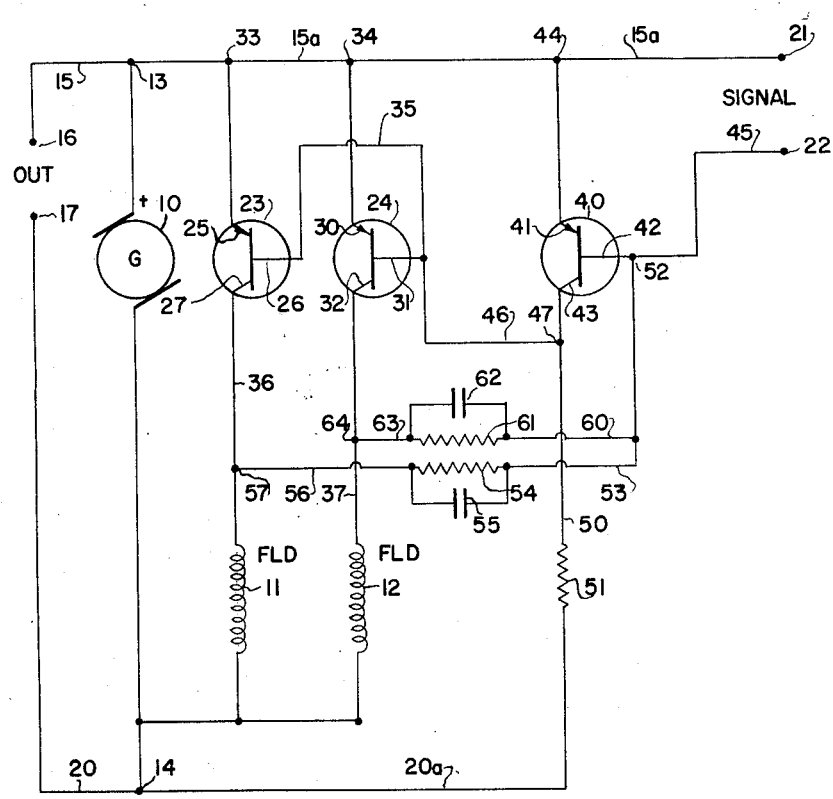
INVENTOR.
DONALD L. CRONIN
BY *Omund R Dahle*
ATTORNEY

United States Patent Office 2,890,404
Patented June 9, 1959

2,890,404

GENERATOR CONTROL SYSTEM EMPLOYING SEMICONDUCTOR APPARATUS

Donald L. Cronin, Richfield, Minn., assignor to Minneapolis-Honeywell Regulator Company, Minneapolis, Minn., a corporation of Delaware Application June 28, 1957, Serial No. 668,655

12 Claims. (Cl. 322—17)

This invention relates generally to new and improved transistor control apparatus for controlling the excitation of rotary generators. In the field of transistor control of generators, especially where it is desired to control relatively large field excitation currents, the problem arises of obtaining suitable transistors having a sufficiently large current carrying capacity to properly control the current flowing in the generator exciting field. It has been found that the answer does not lie in paralleling two or more transistors directly, since only by extremely carefully matching of transistors or by utilizing auxiliary electronic components in the circuit can it be insured that parallel transistors will share the load. In this invention the generator is wound with a plurality of field exciting windings and the output electrodes of a plurality of transistors, respectively, are placed in series with each of the field windings. The input electrodes of the transistors may be connected in parallel, in which case a single control signal is effective to control substantially equally the conductivity of the plurality of transistors.

It is an object of this invention to provide improved transistor control apparatus for rotary type generator means having a plurality of field exciting windings in which each field winding is associated with an individual control transistor.

It is a further object of this invention to provide in generator regulating apparatus a plurality of transistor switching means which have their control electrodes connected in parallel to a source of control signal and in which each of the switching transistors controls a separate field exciting winding of the generator.

These and other objects of this invention will be more clearly understood upon a consideration of the specification, claims, and drawing of which the single figure of the drawing is a schematic representation of an embodiment of the invention.

Referring now to the drawing, there is disclosed an electrical generator 10 which also includes a plurality of field exciting windings 11 and 12. The two exciting windings shown are merely illustrative of a plurality of windings and more than two windings may be desirable. The generator, as shown, is of the self-excited D.C. generator type, such as may be used on vehicles for the purpose of recharging batteries. The generator to be controlled is not limited to the D.C. type generator of the type shown, but may be any suitable type, for example, a generator of the amplidyne type family, or an A.C. generator, the output of which may or may not be rectified. It will be understood that the plurality of field windings and the associated transistor control circuit may be excited from a separate source whereby the generator does not need to be of the self-exciting type.

The generator 10 has a pair of terminals 13 and 14, the generator terminal 13 being connected by a conductor 15 to an output load terminal 16 of a pair of output load terminals 16 and 17. The generator terminal 14 is connected by a conductor 20 to the second load terminal 17.

The generator terminal 13 is also connected by an extension 15a of the conductor 15 to a signal input terminal 21 of a pair of signal terminals 21 and 22.

A pair of current controlling transistors 23 and 24 are disclosed in the drawing, transistor 23 having an emitter electrode 25, a base electrode 26 and a collector electrode 27, and transistor 24 having an emitter electrode 30, a base electrode 31, and a collector electrode 32. The transistors are preferably of the junction type, but any suitable transistor may be used. PNP transistors are shown in the drawing, however, by proper consideration of energizing potentials suitable NPN units may be used. The emitter electrodes 25 and 30 are connected, respectively, to junctions 33 and 34 on the conductor 15a. The base electrodes 26 and 31 are directly interconnected by a conductor 35. The collector electrode 27 is connected by a conductor 36 to one extremity of the field excitation winding 11, and the collector electrode 32 is connected by a conductor 37 to one extremity of the field excitation winding 12. The other extremities of the field winding are connected to the negative generator terminal 14.

A third transistor 40 is disclosed in the drawing which transistor has an emitter electrode 41, a base electrode 42, and a collector electrode 43. The emitter electrode is directly connected to a junction 44 on the conductor 15a. The base electrode 42 is connected by a conductor 45 to the signal input terminal 22, the collector electrode 43 of transistor 40 is connected by a conductor 46 to the base electrode 31 of transistor 24, and by the conductors 46 and 35 to the base electrode 26 of transistor 23. A junction 47 on the conductor 46 is connected by a conductor 50, a resistance element 51 and a conductor 20a to the negative generator terminal 14. A junction 52 on the conductor 45 is connected by a conductor 53, a parallel combination of a resistor 54 and a capacitor 55, and a conductor 56 to a junction 57 on the conductor 36 which is connected to the collector electrode 27. The junction 52 is also connected by a conductor 60, a parallel combination of a resistor 61 and a capacitor 62, and by a conductor 63 to a junction 64 on the conductor 37 which is connected to the collector electrode 32.

In considering the operation of this circuit it should be recalled that the general object of this invention relates to providing apparatus for controlling excitation of generating means having a plurality of exciting windings. It is well known in the transistor art that transistors are rated as to maximum allowable collector current and that if proper circuit precautions are not taken, the transistor may conduct in excess of the maximum rated current whereby the transistor is destroyed or damaged. In the case of controlling the exciting current of generators having a relatively large field exciting current it becomes necessary to utilize more than a single transistor to control the required current. In the past, attempts have been made to operate transistors in parallel, however, due to the dissimilarity between transistor units of the same type it becomes difficult to insure that the parallel transistors will each take the proper share of the load. Various elaborate biasing schemes have been developed for insuring that the loads will be divided but this calls for numerous additional components which add to the bulkiness, cost, and complexity of the equipment.

In this invention the generator requiring relatively large total field exciting current is constructed with a plurality of exciting windings which have accumulative action on the generator. The figures disclose but two field windings for the purpose of clarity of explanation, however, any required number of fields may be utilized within the spirit of this invention. As is shown in the drawing, each of the field windings has in series therewith the output electrodes of a separate transistor, that is, field winding 11 has in series therewith the collector and emitter electrodes of transistor 23, and field winding 12 has in series therewith the collector and emitter electrodes of transistor 24. It will be noted that while the input electrodes of the transistors 23 and 24 are connected in parallel, each of the transistors has a separate load connected in the output circuit so that there is no tendency for one of the transistors to take the entire load current as would be the case if the two transistors were directly paralleled. The plurality of field windings are constructed so that the sum of the reduced current in each exciting winding results in an equivalent magnetic effect on the generator excitation as would the single high current winding. For example, if a generator requires 5 amperes of field current in the exciting winding, a substantially equivalent control may be obtained by five exciting windings each of which carries one ampere of current when the windings are accumulative in excitation.

The transistor 40 is an amplifier which is effective to control the conductivity of the transistors 23 and 24. In the circuit as shown, a current path can be traced from the conductor 15a, the junction 44, to the emitter electrode 41, through the transistor from emitter to collector, from collector electrode 43 through the conductor 46 to the junction 47, then through conductor 50 and resistor 51 to the negative conductor 20a. The signal potential applied to terminals 21 and 22 is effective to control the conductivity of the transistor 40 since this signal appears across the base and emitter electrodes of transistor 40.

Let us assume an initial condition in which the transistors 23 and 24 are conductive so that current is flowing from the conductor 15a through the transistors respectively to energize the field windings 11 and 12. Let it also be asumed that the signal potential is increasing in magnitude in a direction to increase the conductivity of the transistor 40. As the current flowing from the collector electrode 43 through resistor 51 increases, the voltage at the base electrodes 26 and 31 is changed in a positive going direction due to the increased voltage drop across resistor 51. At some point the conductivity of the transistors 23 and 24 will be reduced, thus increasing the effective impedance of the transistors, whereupon the potentials at the collectors 27 and 32, and at junctions 57 and 64 will be changed in a negative going direction. These changing potentials on the collector electrodes of the transistors 23 and 24 will be fed back through the parallel combinations of resistor 54 and capacitor 55 and of resistor 61 and capacitor 62 to the base electrode 42 of transistor 40. This feedback is in a direction to further increase the conductivity of the transistor 40 whereupon the conduction of the transistors 23 and 24 is further reduced.

By proper design of the circuit components this transistor circuit may be made to have a switching action where the transistors 23 and 24 are either operating in a state of relatively high conduction or in a state of relative cut-off as a function of the signal applied. By modification of or by elimination of the feedback connections from the collector electrodes of the transistors 23 and 24 to the base of the transistor 40, the circuit may be made to operate in a proportional fashion, that is, the current flowing through the field windings being proportional to the input signal.

It will be noted, as has been previously mentioned, that the circuit disclosed and described above is related to control of a self-excited generator. As such, the circuit of this invention is easily adaptable for use in the copending application of Cronin et al., entitled "Semi-conductor Apparatus," Serial No. 640,168, filed February 14, 1957, which relates generally to a transistor voltage regulator for vehicular use. If the circuit of this invention is used as a voltage regulator the signal input terminals 21 and 22 may be connected to sense the magnitude of the generated voltage of the generator 10.

As has been previously stated, it is not necessary that the generator be of the self-excited type, in which case it may be desirable to energize the transistor circuitry and the field windings from a separate source.

The signal potential connected to the input terminals need not be merely a direct function of the generated potential but may be a function of a control system condition in which the signal is representative of a condition to be controlled. This invention has application, for example, in a closed-loop amplidyne generator-motor control system. Another example may be in the field of motor speed control.

Many changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration only.

I claim:

1. Control apparatus comprising: electrical generator means, said generator means including a plurality of excitation windings, said excitation windings when energized having an additive effect on the control of said generator means; a plurality of semiconductor amplifier means, each of said semiconductor means having a plurality of electrodes including control and output electrodes; means including the output electrodes of a first of said semiconductor means connecting a first of said excitation windings to a source of electrical energy, and means including a separate one of said semiconductor means similarly connecting each of the other of said excitation windings, respectively, to said source of energy; control means for producing a control signal potential, said signal potential having a magnitude which is a function of a condition being sensed; and means connecting the control electrode of each of said semiconductor means to said control signal potential, whereby the conductivity of each of said semiconductor means is simultaneously and equally controlled in response to said signal potential magnitudes so that simultaneous and equal energization of each of said plurality of excitation windings is accomplished.

2. Control apparatus comprising: electrical generator means having a plurality of excitation windings, said windings being, in effect, in parallel, and when energized having an additive effect on the control of said generator means; a plurality of semi-conductor amplifier devices, each of said semi-conductor amplifier devices having a plurality of electrodes including control and output electrodes; means connecting the output electrodes of a separate one of said semi-conductor devices, respectively, in current controlling relation to each of said plurality of excitation windings; means including said semi-conductor devices connecting each of said excitation windings to a source of electrical energy; signal producing means for producing a potential having a magnitude which is a function of a condition being sensed; and circuit means connecting the control electrodes of said plurality of semiconductor devices in parallel and connecting the output of the signal producing means in controlling relation to the paralleled control electrodes whereby the conductivity of each of said semiconductor means is simultaneously controlled alike in response to said potential magnitude, so that simultaneous energization of each of said plurality of excitation windings is accomplished.

3. Control apparatus comprising: electrical generator means having a plurality of excitation windings, said windings being adapted to be energized simultaneously and when energized each having an additive effect on the control of said generator means; a plurality of semi-conductor current controlling devices, each of said semiconductor devices having a plurality of electrodes including a collector electrode, an emitter electrode, and a control electrode, said emitter and collector electrodes comprising output electrodes; means for connecting the output electrodes of a separate one of said semi-conductor devices in circuit, respectively, with each of said plurality of excitation windings in current controlling relation thereto; a source of energizing potential; means including said semi-conductor devices connecting said energizing potential to said excitation windings; signal producing means for producing an electrical signal having a magnitude which is a function of a condition being sensed; and means connecting the output of said signal producing means in controlling relation to the control electrode and one of the emitter and collector electrodes of each of said plurailty of semi-conductor devices whereby each of said semiconductor devices is simultaneously and equally made conductive in response to said electrical signal so that simultaneous energization of each of said plurality of windings is accomplished.

4. Control apparatus comprising: electrical generator means having a plurality of excitation windings, said windings being energized simultaneously and when energized each winding having an effect on the generator excitation which augments and reinforces the effect of the other windings; a plurality of semi-conductor current controlling means, each of said semi-conductor means having a plurality of electrodes including control and output electrodes; circuit means connecting each of said plurality of excitation windings to a source of electrical energy, said means including the output electrodes of said semi-conductor means, a separate one of said semi-conductor means being connected to each of said windings; signal means for producing a signal potential having a magnitude proportional to a condition; and means connecting said control electrodes in parallel and connecting the output of said signal means in controlling relation to the control electrodes of said plurality of semi-conductor means.

5. Control apparatus comprising: rotary electrical means being controlled by a plurality of exciting windings; a plurality of semi-conductor means, each of said semi-conductor means having a plurality of electrodes including control and output electrodes; means connecting the output electrodes of separate semi-conductor means, respectively, in current controlling relation to each of said plurality of exciting windings; means including said semi-conductor means connecting each of said exciting windings to a source of electrical energy; signal producing means for producing a potential having a magnitude proportional to a condition; and circuit means connecting the control electrodes of said plurality of semiconductor means in parallel and connecting the output potential of said signal producing means to the control electrodes of said semi-conductor devices, whereby said plurality of windings are simultaneously and equally controlled and said rotary electrical means is thereby controlled in response to said condition.

6. Control apparatus comprising: electrical generator means having a plurality of exciting windings connected to act in parallel so that when energized each winding augments the remainder of the windings for controlling the energization thereof; a plurality of semi-conductor devices, each of said semi-conductor devices having a plurality of electrodes including control and output electrodes; means connecting the output electrodes of a separate semi-conductor device in circuit with each of said plurality of exciting windings; said exciting windings being adapted to be connected to a source of electrical energy, said semi-conductor devices being controllable to control the current flowing in said exciting windings; signal producing means for producing a signal potential having a magnitude proportional to a condition; and circuit means connecting the control electrodes of said plurality of semiconductor devices together to insure simultaneous conduction of said semiconductor devices, and connecting the output of the signal producing means in current controlling relation to said semiconductor control electrodes.

7. Control apparatus comprising: self excited generating means having a plurality of exciting windings for controlling the energization thereof, said exciting windings when energized each having an additive effect on the control of said generating means; a plurality of semi-conductor devices, each of said semi-conductor devices having a plurality of electrodes including control and output electrodes; means connecting the output electrodes of a separate one of said plurality of semi-conductor devices, respectively, in series with each of said plurality of exciting windings, said exciting windings being energized by the output of sad self excited generator means, said semi-conductor devices being controllable to regulate the current flowing through said exciting windings; and means connecting the control electrodes of said plurality of semiconductor devices in parallel and connecting said paralleled electrodes to a source of signal potential, the magnitude of the signal potential being proportional to a condition, said signal being effective to control simultaneously the conductivity of each of said plurality of semiconductor devices so that simultaneous energization of each of said plurality of exciting windings is accomplished to control the output of said generator means.

8. Control apparatus comprising: self excited generating means having a plurality of exciting windings for controlling the energization thereof, said windings being connected so that the control action of each winding augments the control action of each of the other windings; a plurality of semi-conductor devices, each of said semi-conductor devices having a plurality of electrodes including control and output electrodes; means connecting the output electrodes of a separate semi-conductor device, respectively, in circuit with each of said plurality of exciting windings, said exciting windings being energized by the output of said self excited generator means, said semi-conductor devices being controllable to regulate the current flowing through said exciting windings; a source of signal potential, the magnitude of which is proportional to a condition being sensed; and means connecting the control electrodes of said plurality of semi-conductor devices in parallel to said source of signal potential, said signal thereby being effective to simultaneously control the conductivity of each of said plurality of semiconductor devices alike, and thus control the output of said generator means.

9. Control apparatus comprising: electrical generating means being controlled by a plurality of exciting windings, said windings when energized having additive effects on the control of said generator means; a plurality of semi-conductor means, each of said semi-conductor means having a plurality of electrodes including control and output electrodes; means connecting the output electrodes of separate semi-conductor means in series with each of said plurality of excitation windings; a source of electrical energy; means including said semi-conductor means connecting each of said excitation windings to said source of electrical energy; signal producing means for producing a potential having a magnitude proportional to a condition; means connecting said control electrodes in parallel; and circuit means connecting the output of said signal producing means to the paralleled control electrodes of said semi-conductor means.

10. Voltage control apparatus comprising: self excited generating means having output terminals and having a plurality of exciting windings the energization of which is effective to control the magnitude of the generated voltage, said plurality of exciting windings each being connected to said generator means such that when energized all the windings have additive effects on the control of said generating means; a plurality of semi-conductor devices, each of said semi-conductor devices having a plurality of electrodes including control and output electrodes; means connecting the output electrodes of a separate semi-conductor device, respectively, in series with each of said plurality of exciting windings, said exciting windings being energized by the output of said self excited generator means, said semi-conductor devices being controllable to regulate the current flowing through said exciting windings; a source of signal potential, the magnitude of which potential is proportional to the generated voltage; and means connecting the control electrodes of said plurality of semi-conductor devices in parallel to said source of signal potential, said signal potential being effective to simultaneously control the conductivity of each of said plurality of semi-conductor devices in like manner to control the output of said generator means.

11. Voltage control apparatus comprising: electrical generating means having a plurality of exciting windings the energization of which is effective to control the magnitude of the generated voltage; a plurality of semi-conductors, each of said semi-conductors having a plurality of electrodes including control and output electrodes; means connecting the output electrodes of a separate semi-conductor in circuit with each of said plurality of excitation windings; a source of electrical energy; means including said separate semi-conductors connecting each of said excitation windings to said source of electrical energy; signal producing means for producing a potential having a magnitude which is a function of the generated voltage; and circuit means connecting said control electrodes in parallel and connecting the output of said signal producing means to the paralleled control electrodes of said semi-conductors, said signal potential being effective to simultaneously and equally control the conductivity of each of said plurality of semi-conductors to thereby control the energization of and thus the output of said generator means.

12. Voltage regulator apparatus comprising: rotary electrical means providing an output and having a plurality of exciting windings, the energization of which exciting windings is effective to control the magnitude of the output; a plurality of semi-conductor devices, each of said semi-conductor devices having a plurality of electrodes including control and output electrodes; means connecting the output electrodes of a separate semi-conductor device, respectively, in circuit with each of said plurality of exciting windings, said exciting windings being adapted to be connected to a source of electrical energy, said semi-conductor devices being controllable to control the current flowing through said exciting windings; signal producing means for producing a signal potential having a magnitude proportional to the rotary electrical means output; means directly connecting together said control electrodes; and means connecting the output of said signal producing means in current controlling relation to the control electrodes of said semi-conductor devices.

References Cited in the file of this patent

UNITED STATES PATENTS

| | | |
|---|---|---|
| 2,099,468 | Serstivik | Nov. 16, 1937 |
| 2,238,811 | Crever | Apr. 15, 1941 |
| 2,478,203 | McCoy | Aug. 9, 1949 |
| 2,578,679 | Edwards | Dec. 18, 1951 |